United States Patent

Weiss

[11] Patent Number: 5,648,026
[45] Date of Patent: Jul. 15, 1997

[54] MULTIPLE UTILIZATION OF BLOW-MOLD AIR

[75] Inventor: Ronald Weiss, Bargteheide, Germany

[73] Assignee: Krupp Corpoplast Maschinenbau GmbH, Germany

[21] Appl. No.: 340,231

[22] Filed: Nov. 16, 1994

[30] Foreign Application Priority Data

Nov. 26, 1993 [DE] Germany .......................... 43 40 291.7

[51] Int. Cl.⁶ .................. B29C 49/16; B29C 49/56
[52] U.S. Cl. ................. 264/37; 264/40.3; 264/526; 264/529
[58] Field of Search ................. 264/37, 40.3, 40.1, 264/526, 529

[56] References Cited

U.S. PATENT DOCUMENTS

| | | |
|---|---|---|
| 2,345,082 | 3/1944 | Waseige .................... 425/149 |
| 3,275,728 | 9/1966 | Martino . |
| 3,400,636 | 9/1968 | Schneider . |
| 3,888,961 | 6/1975 | Schonewald . |
| 4,488,863 | 12/1984 | Collette .................... 264/37 |
| 4,498,854 | 2/1985 | Ross . |
| 4,790,741 | 12/1988 | Takakusaki et al. . |
| 5,141,682 | 8/1992 | Steinbichler et al. . |
| 5,244,610 | 9/1993 | Kitzmiller .................... 264/40.3 |

FOREIGN PATENT DOCUMENTS

3111925A1 10/1982 Germany .
54-033566 3/1979 Japan .................... 264/529
2095759 10/1982 United Kingdom .

OTHER PUBLICATIONS

*Design Engineering*, "The Efficient Use Of Compressed Air", Dec. 1977, p. 51 and following sides.
Patent Abstracts of Japan, vol. 18, No. 115 (M-1566), Feb. 24, 1994, JP 53 09 726, Nov. 22, 1993.

*Primary Examiner*—Catherine Timm
*Attorney, Agent, or Firm*—Harness, Dickey & Pierce, P.L.C.

[57] ABSTRACT

The procedure serves the purpose of molding a container from a thermoplastic material. After a temperature treatment a moldable object is fed to a blow station, which has a blow mold that is provided for the purpose of contouring the container. The temperature-treated moldable object is inserted into the blow mold. By feeding in high-pressure blow air, the moldable object is expanded. In addition at least one other pneumatic working step with low-pressure air is carried out, with this air being taken from a low-pressure air supply. The low-pressure air supply has a smaller pressure level than the high-pressure blow-air supply. After the moldable object has been expanded, high-pressure blow air streaming out of the molded container held in the blow mold is fed to the low-pressure air supply during a transition phase. In the region of the low-pressure air supply a pressure monitoring is carried out for the purpose of defining a maximum low-air pressure to be provided. After the transition phase a venting of the container that is held in the blow mold is performed vis-a-vis an ambient pressure.

9 Claims, 5 Drawing Sheets

# 5,648,026

MULTIPLE UTILIZATION OF BLOW-MOLD AIR

BACKGROUND AND SUMMARY OF THE INVENTION

This invention concerns a procedure for molding a container made of a thermoplastic material, whereby a moldable object that has been temperature-treated is conveyed to a blow station that has a blow mold provided for the purpose of contouring the container, and into which mold the temperature-treated moldable object is inserted, and whereby through a feeding in of high-pressure blow air the moldable object is expanded, and also whereby at least one other pneumatic working step is executed with the use of low-pressure air that is taken from a low-pressure air supply, which has a lower pressure level than does the high-pressure blow air.

Moreover the invention also concerns a device for the molding of a container made of a thermoplastic material, where this device has at least one blow station provided for the accommodation of a temperature-treated moldable object, with the station being equipped with a mold whose inside contour is matched to that of the container to be molded, and where this device is equipped with a high-pressure blow-air supply for expanding the moldable object, and in connection with which at least one structural element in the region of the blow station is connected with a low-pressure air supply for its actuation, with this low-pressure supply making low-pressure air available whose pressure level is lower than high-pressure blow air stored up in the region of the high-pressure blow-air supply.

One way that the molding of such a container can take place is, for example, in a situation where first a moldable object made of polyethylene-terephthalate (PET) is made in the injection-molding process, the moldable object is then heated up after an intermediate storage, and subsequently it is conveyed to the blow station. But it is also known how to make containers according to the spray-blowing method, in which without the interposition of a heating process the moldable object is conveyed to the blow station immediately after its production and upon reaching an adequate stability. Finally, it is also known how to make moldable objects out of tubular sections that are sealed in the region of one of their ends and are provided with a suitable nosepiece in the region of their other end.

What is common to all of these procedures is that the moldable object is smaller in outline than the container to be made. Therefore within the blowing station the moldable object is subjected to the action of compressed air, in order to reshape it into the container that is to be made. In this inflation process, in addition to a reduction in wall thickness due to surface expansion an orienting of the material also takes place. The result of this is that the thin walls of the container have a very high shape stability, which makes the container suitable for a multitude of applications.

Various methods are known for carrying out the blowing process. For one thing, it is possible to employ a uniform blow pressure, which is introduced into the moldable object that is to be inflated, and after an adequate shaping this pressure is vented from the finished container against an ambient pressure. It is likewise already known how to first perform a pre-widening of the moldable object by means of a fairly low pressure, in such a way as to already bring this relatively far in the direction of the shape of the container to be made, and only then to undertake the final impressing of the finer contour of the container by means of a higher pressure. In this method as well, after the container is finished the blow air is vented against an ambient pressure.

In the case of heavy-duty blowing machines, whose normal production output may lie in the range of 2,000 bottles per hour to 20,000 bottles per hour and which customarily produce containers with volumes in the range of 0.5 to 3 liters, considerable quantities of compressed air are therefore needed. So powerful compressors are required to provide this compressed air, which for one thing cost a great deal to purchase because of the large size needed for such a power output, and for another thing consume a considerable amount of energy because of the amount of air compression involved.

Another disadvantage of high compressed-air consumption is the fact that in order to have a high production rate it is necessary to allow large air-flow velocities in venting the finished container. But large flow velocities in venting make it necessary to have powerful sound absorbers, which in turn contribute to increasing the production costs. Moreover, despite the use of such sound absorbers a relatively high noise level is generated.

Therefore the problem of the present invention is to improve upon a procedure of the sort mentioned at the beginning in such a way that the consumption of high-pressure blow air is reduced.

This problem is solved in accordance with the invention in such a way that after the moldable object has expanded, high-pressure blow air streaming out of the molded container that has been secured in the blow mold is fed to a low-pressure air supply during a transition phase, and that in the region of the low-pressure air supply a pressure monitoring is performed in order to define a maximum amount of low air pressure to be provided, and that after this transition phase a venting of the container being held in the blow mold is carried out vis-a-vis an ambient pressure.

Another problem of the present invention is to design a device of the sort mentioned at the beginning, such that by means of a small investment in apparatus, a reduction in the consumption of high-pressure blow air can be achieved.

This problem is solved in accordance with the invention in such a way that within the region of a fastening device that hooks up the blow station to the blow-air supply, a switch-over mechanism is positioned that conducts high-pressure blow air into the region of the blow station during a primary blowing phase, and after an end to the primary blowing phase this mechanism develops, during a transition phase, a connection between the blow station and the low-pressure air supply for the purpose of blow-air transfer, and that the blow station is connected to a disengaging element that after the blow process has ended vents the inside space of the container against an ambient pressure, and that the low-pressure air supply has a pressure limiter for monitoring the presence of a maximum pressure for the low-pressure air.

Because of the transfer of high-pressure blow air into the low-pressure region, in a standard operating configuration a separate provision of low-pressure air is not necessary. This relatively large degree of economizing can be implemented just with a small difference in pressures. In the case of a realistic pressure ratio of 2:1, the savings is about 20%. The final venting against the ambient pressure avoids a danger stemming from an inadequate pressure reduction. Because of the pressure limiter, a pre-assignable pressure level is adhered to.

In the process of venting against the ambient pressure, only a relatively small pressure difference still needs to be removed, resulting in a considerable reduction in noise emissions. Before venting against the ambient pressure, an additional pressure transfer can be made also into an operational-air system that has a pressure level below that of the low-pressure air supply for an initial blowing stage.

In order to provide a definite pressure level in the region of the low-pressure air supply and to ensure an independence from various different pressure conditions upon start-up or in the case of malfunctions, it is proposed that the low-pressure air supply be equipped with an auxiliary source of low-pressure air that is separate and independent of a compressed-air transfer from the region of the blow station.

For the execution of the molding of the container, it is proposed that the moldable object be stretched in the direction of a longitudinal axis during its shaping into the container. In this way, good orientation conditions can be produced in the finished container.

In order to help to provide for a suitable material distribution within the region of the container, it is proposed that low-pressure air be fed to the container for pre-expansion purposes before high-pressure blow air is fed in.

In order to adequately fix in place the container within the blow mold, it is proposed that after executing the transfer phase, a pressure level be maintained within the container that corresponds to the pressure level within the low-pressure air supply.

An effective pressure interval for the high-pressure blow air is provided by having the container acted on with a pressure in the range of 25-40 bars by way of the high-pressure blow air supply.

In using the low-pressure air supply for supplying blow air to the container, it is useful for the container to be acted on by the low-pressure air supply with a pressure in the range of 10-25 bars.

Another variant of the procedure consists in using the low-pressure air supply to provide air to pneumatic structural elements that carry out the positioning movements. In such an embodiment, as a rule it is useful to provide a pressure in the range of 2-8 bars for the low-pressure air.

The process time can be optimized by having the transition phase carried out after shaping the contour of the container and before shape stability is produced by cooling. In this way it is possible in particular to already lower the pressure within the container before any venting of the container, to such an extent that the venting phase itself can be arranged to be relatively short. Given a pre-set length for the total production-time interval, the process time itself can be lengthened in this way, since there is a shorter time requirement for the venting. The cooling can be done, for example, by an attachment placed on the mold.

A compact construction can be realized by using a switchable valve for the execution of the pneumatic switch-over processes.

For purposes of a simple electronic control, it is helpful to have the valves designed to be electromagnetic valves.

A control that is independent of electronic components can also be made available by providing a plate cam for the execution of the pneumatic switch-over movements, with this being equipped with air slots subdivided into segments having differing pressurizations, and by having a follower plate with contact holes that rotates in relation to the plate cam.

In order to even out the pressure conditions, it is proposed that a compressed-air cell be positioned in the region of the low-pressure air supply.

It is useful to avoid great fluctuations in pressure within the region of the low-pressure air supply due to the blow-air transfer by positioning in the region of the transfer mechanism a pressure reducer, which at least in this region constitutes the pressure limiter.

BRIEF DESCRIPTION OF THE DRAWINGS

In the drawings, exemplifying embodiments of the invention are schematically shown. These illustrate.

DESCRIPTION OF THE PREFERRED EMBODIMENT

Figure 1:
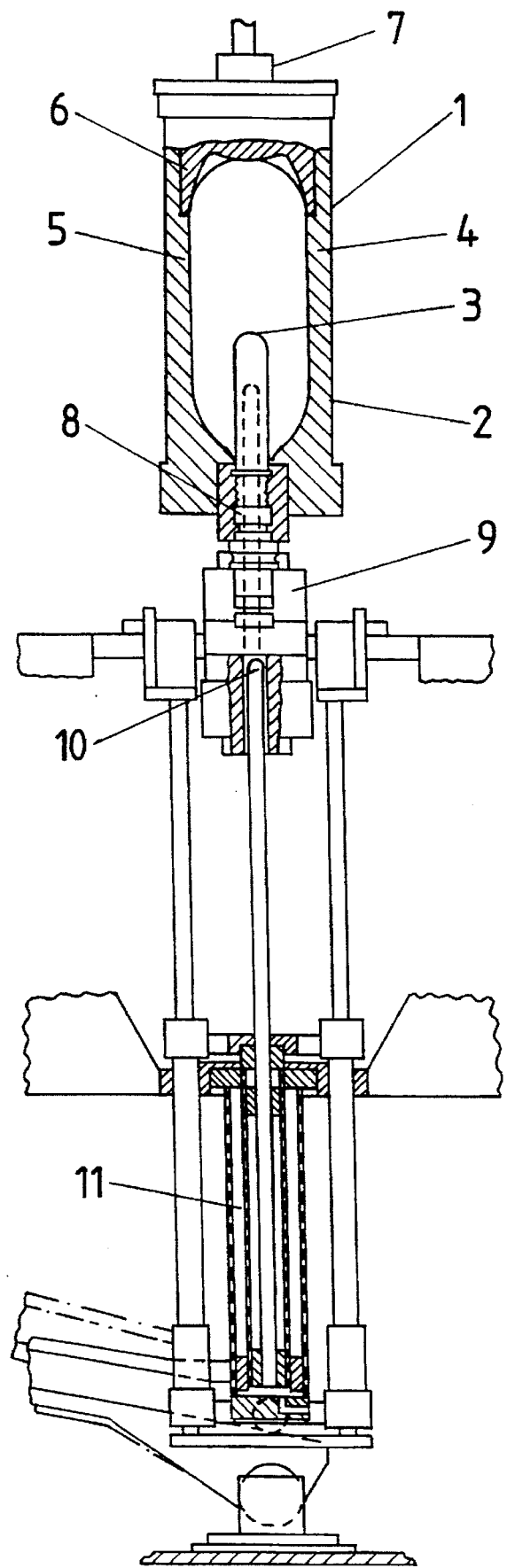
FIG. 1 a partially cut-away diagrammatic representation of a blow station with a stretching mechanism, FIG. 2 a diagrammatic representation of a pressure pattern produced in blowing a container according to the prior art, and according to a special embodiment of the procedure based on the invention, FIG. 3 a block diagram for the purpose of elucidating the essential functional components, FIG. 4 a schematic diagram of a rotating plate cam with slot-like air-conveying regions and FIG. 5 a schematic representation of the procedure when there is a transfer of compressed air from a higher compressed-air region into a lower compressed-air region after the final impressing of the shape of the container.

The device for molding a container consists essentially of a blow station (1), which is equipped with a mold (2) into which a moldable object (3) can be inserted. The moldable object (3) can be an injection-molded piece made of polyethylene terephthalate. In order to permit the insertion of the moldable object (3) into the mold (2) and in order to permit a removal of the finished container, the mold (2) consists of mold halves (4,5) and a floor portion (6), which can be position-controlled by a displacement device (7). The moldable object (3) can be held in the region of the blow station (1) by a transport mandrel (8), which together with the moldable object (3) passes through a number of treatment stations within the device. But it is also possible to insert the moldable object (3) directly into the mold (2), for example by using grippers or other handling means.

In order to make it possible to have a compressed-air lead-in, a connecting piston (9) is positioned beneath the transport mandrel (8), which feeds compressed air to the moldable object (3) and simultaneously makes a seal with respect to the transport mandrel. But in a related design, it is also basically conceivable to use fixed compressed-air lead-ins.

The moldable object (3) is stretched by means of a stretching rod (10), which is positioned by a cylinder (11). But it is also basically conceivable to perform a mechanical positioning of the stretching rod (10) by way of curve segments that are acted on by sensing rollers. The use of curve segments is appropriate in particular when a number of blow stations (1) are arranged on a rotating blow wheel. A use of cylinders (11) is appropriate when stationary blow stations (1) are provided.

Figure 2:
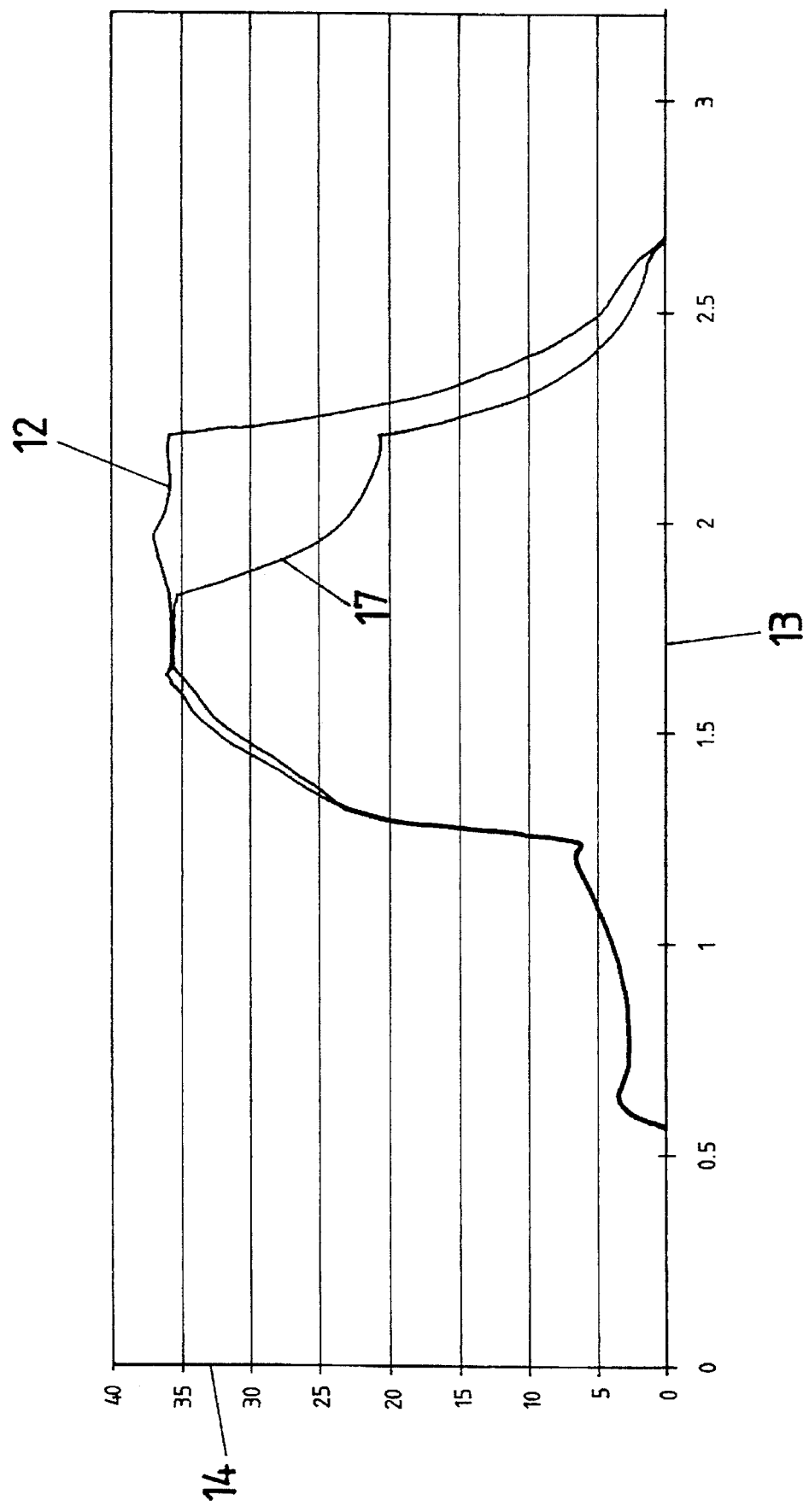

FIG. 2 shows two pressure diagrams for the purpose of elucidating a variant of the invention. A compressed-air pattern (12) is shown in a two-coordinate system that is made up of a time axis (13) and a pressure axis 14. The scale for the pressure axis (14) is bars and that for the time axis (13) is seconds. Up to a point in time of about 1.25 sec., a blow pressure is fed in from a low-pressure air supply. The low-pressure air supply has a pressure level in the range of about 10-25 bars. However, in the region of the container to be molded this supply pressure does not set in within this time interval, since because of the expansion of the moldable object (3) and the volume enlargement that results from this, compressed air flows back, and because of flow resistances that are present a corresponding pressure reduction is brought about. From the time of about 1.25 sec. on, compressed air is fed in from a high-pressure blow-air supply (16). After about 1.7 sec. the pressure inside the container being made reaches approximately its final value, which in this case is about 36 bars. A typical span for the pressure in the high-pressure blow-air supply (16) is 25–40 bars.

After about 2.2 sec., the compressed-air feed from the high-pressure blow-air supply (16) comes to an end and is followed by a venting against an ambient pressure. The venting process is ended after about 2.7 sec. All the indicated time values here have been in reference to the origin of the coordinate system, consisting of the time axis (13) and the pressure axis (14).

Compared to the pressure pattern (12), which corresponds largely to the prior art, a modified compressed-air pattern (17) shows substantial differences. Up to a time of about 1.3 sec., the compressed-air patterns (12, 17) are roughly identical. But from this point in time on, the modified compressed-air pattern (17) initially has a steeper slope, but then intersects the compressed-air pattern (12) at about 1.7 sec. After about 1.8 sec., in the modified compressed-air pattern the pressure within the container is reduced. Here a transfer of compressed air from the container into the low-pressure air supply (15) takes place. From about 2.2 sec. on, according to the modified compressed-air pattern (17) there is also a venting vis-a-vis an ambient pressure. It is basically conceivable to divide the final venting step into two substeps, where in an initial substep a venting against a lower pressure level again occurs, but with this pressure being provided for further use, and only in a final phase is there a venting against the ambient pressure.

Figure 3:
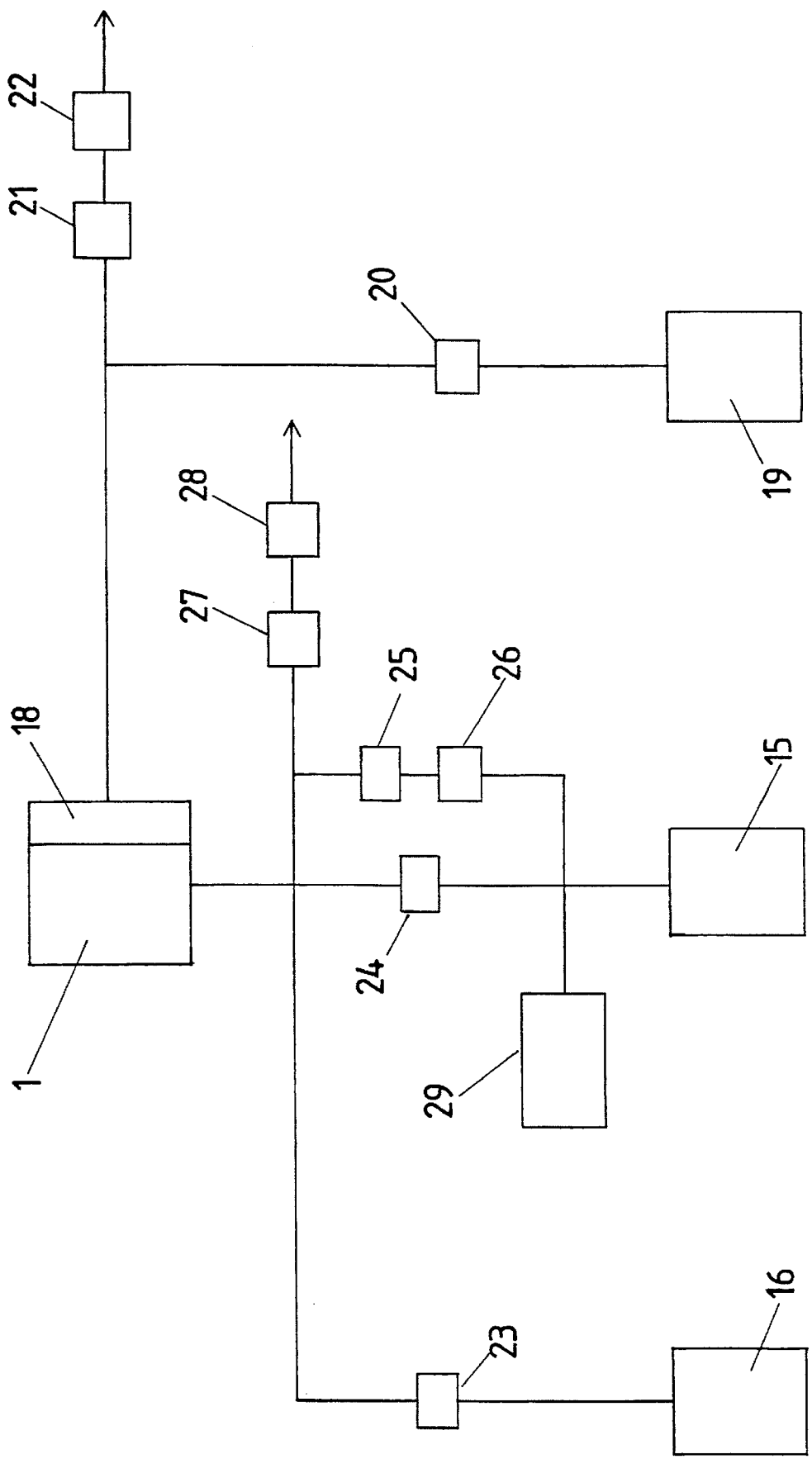

In FIG. 3 a block diagram with the essential functional components is shown for further elucidation, with this diagram giving the sequence of events when the device is used with pilot valves. Here the blow station (1) is equipped with a drive pneumatics (18) that is powered by an operational-air supply (19). Provisions are made for feeding in operational air by means of an operational-air valve (20) and for pressure dissipation by an operational-air venting valve (21). Noise emissions are reduced by means of an operational-air sound absorber (22). However, instead of the driving pneumatics (18), basically mechanical, hydraulic, or electrical drives can also be used.

The high-pressure blow-air supply (16) is connected via a high-pressure valve (23) to the blow station (1). The low-pressure air supply (15) is connected via a low-pressure valve (24). The low-pressure valve (24) is shunted by a pressure reducer and a recirculation valve (26). The blow station (1) is vented via a blow-air venting valve (27) and a blow-air sound absorber (28). There can also be a direct recirculating via the low-pressure air valve (24).

A typical process step can be carried out in such a way that first of all compressed air is conducted from the low-pressure blow-air supply (15) into the region of the blow station (1), and subsequently compressed air is added from the high-pressure blow-air supply (16), and that after an adequate final impressing of the container, but before shape stability is reached, a venting against the low-pressure air supply (15) is carried out. For this purpose the high-pressure valve (23) is closed. The addition of compressed air from the region of the blow station (1) into the region of the low-pressure air supply (15) can take place directly via the low-pressure valve (24). However, in order to avoid pressure transfers of too great a magnitude, it is also conceivable to close the low-pressure valve (24) and to carry out the compressed-air transfer via a series-connected pressure reducer (25) and a recirculation valve (26). Pressure variations can be additionally buffered via a compressed-air cell (29).

The valves can, for example, be designed as switchable electromagnetic valves. However, instead of such valves the pneumatic switching processes can be carried out also via a plate cam (30), which is equipped with air slots (31). Positioned in correspondence with the plate cam (30) is a follower disk (32), which rotates in relation to the plate cam (30). The air slots (31) of the plate cam (30) extend essentially centrally toward a center point (33). In the region of the follower disk (32), contact holes (34) are positioned that are hooked up via connection lines to the blow station (1).

Figure 4:
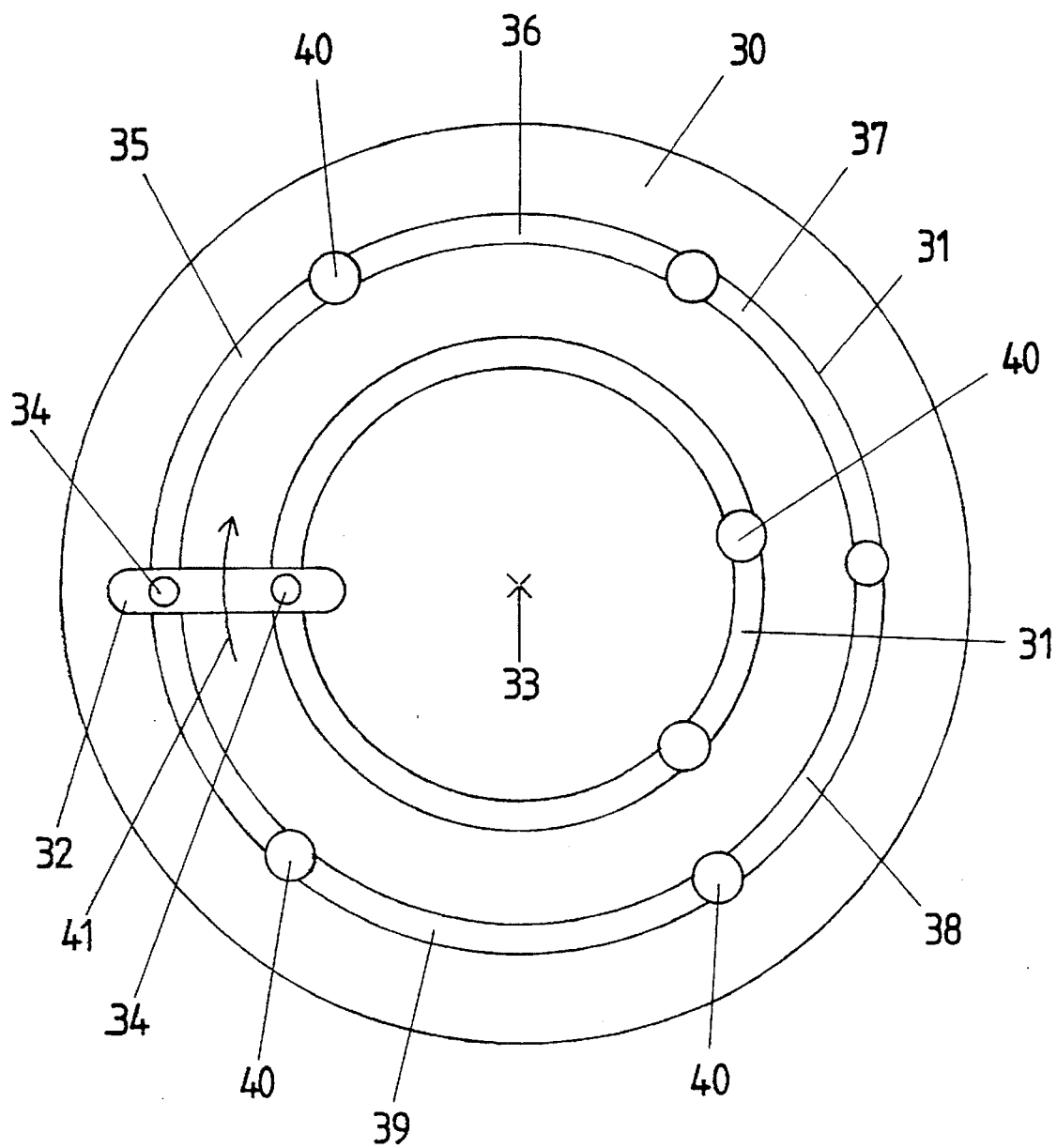

In the exemplary embodiment according to FIG. 4, the air slot (31) drawn in to appear on the outside in the radial direction is subdivided into a pressureless area (35), a low-pressure area (36), a high-pressure area (37), a recirculation area (38), and a venting area (39). In order to ensure a satisfactory implementation in terms of manufacturing technology, the air slot (31) is constructed so as to be continuous in a radial direction and to be subdivided by separation elements (40) into the regions (35, 36, 37, 38, 39). When the follower disk (32), only a small segment of which is shown in FIG. 4, is rotated in the direction of the rotational orientation (41), the regions (35, 36, 37, 38, 39) are passed through successively, and a pneumatic function is exerted that is largely equivalent to the function corresponding to FIG. 3.

Figure 5:
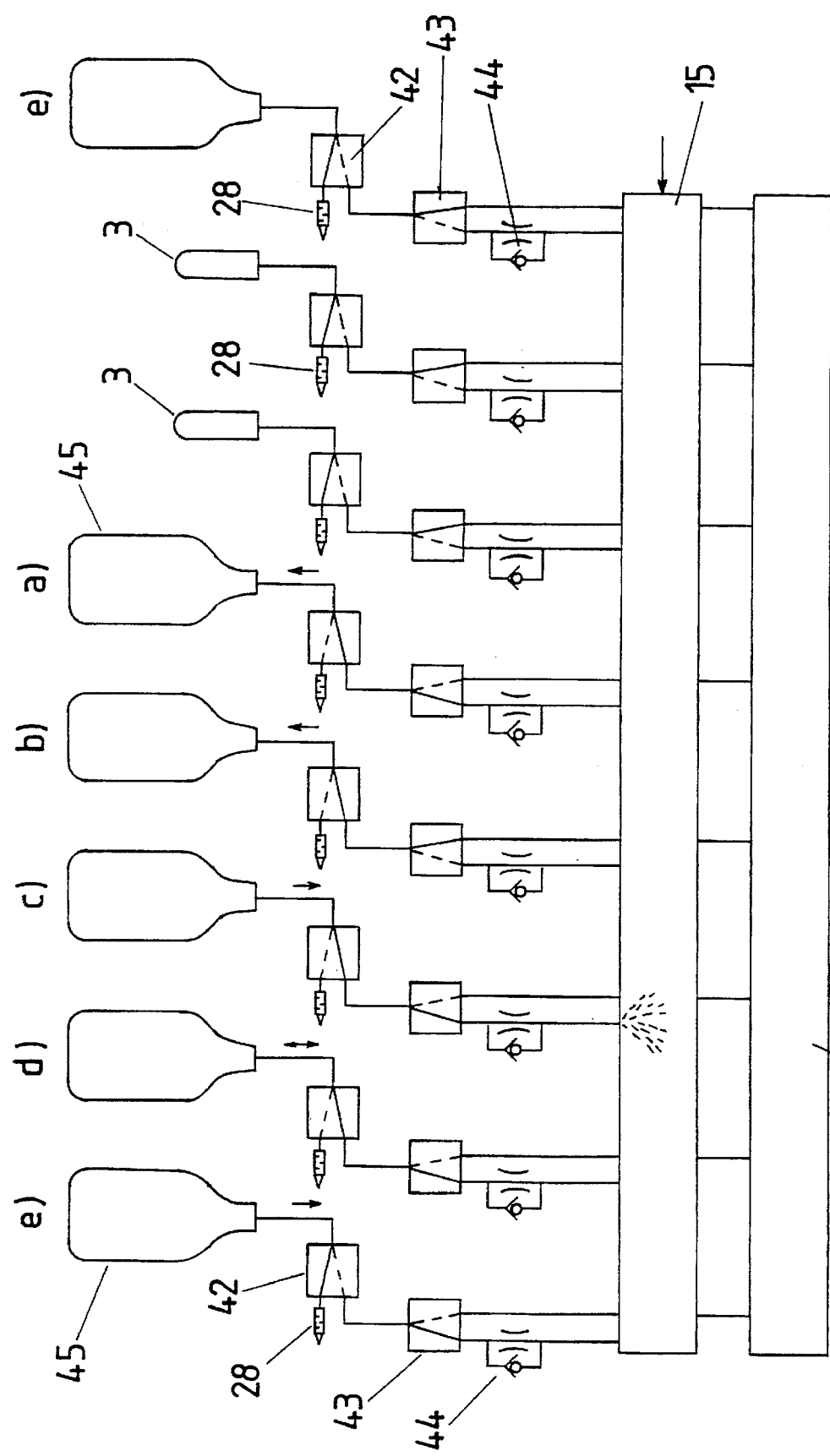

Another variant suitable for the implementation of the procedure is shown in FIG. 5. Here, the blow station (1) is connected to the low-pressure air supply (15) and the high-pressure air supply (16) via 3/2-way valves (42, 43) and also one-way restrictors (44). In an initial process step a), the moldable object (3) is molded into the container (45) by a feeding in of compressed air from the low-pressure air supply (15). For purposes of simplification, FIG. 5 shows only the container (45), and not the blow station 1 surrounding it. The process step a) can, for example, be carried out at a pressure of 15 bars.

Simultaneously with or in advance of the compressed-air feed, the stretch rod (10) is inserted into the moldable object (3).

In process step b) the compressed air is fed from the high-pressure blow-air supply (16). This can be done, for example, at a pressure of 38 bars. In process step c) the container (45) is vented relative to the low-pressure air supply (15) and a pressure reduction takes place down to a level of about 15 bars.

In the process step d) the pressure of 15 bars is held long enough until the container (45) has an adequate shape stability through cooling, for example by means of a mold attachment. In the process step e) the pressure is reduced to the ambient pressure and the container (45) can be removed from the blow station (1).

I claim:

1. A procedure for molding a container from a thermoplastic material in a mold including first and second portions movable between open and closed positions, said procedure including:

forming a moldable object by an injection molding process;

storing said moldable object;

heating said moldable object;

feeding said moldable object into a mold in a blow station;

stretching said moldable object in the direction of a longitudinal axis of said moldable object by use of a stretching rod actuated by a cylinder;

pre-expanding said moldable object within said mold by the addition of a first low pressure air from a first low pressure component;

expanding said moldable object within said mold by the addition of high pressure blow air;

feeding said high pressure blow air to said first low pressure air component during a transition phase and after said moldable object has been formed to the contour of said mold but before said contour has been stabilized by cooling, said first low pressure air component being operable as a low pressure supply;

monitoring the pressure in said first low pressure air component as said high pressure blow air is fed thereto to limit said pressure to a predetermined maximum;

allowing said moldable object to cool to stabilize said contour and thereby form said container;

feeding a portion of said high pressure blow air remaining in said container to a second low pressure air component, said second low pressure air component working at a lower pressure than said first low pressure air component;

thereafter venting said high pressure blow air remaining in said container to atmosphere;

opening said first and second portions of said mold;

removing the molded container from said mold; and utilizing low pressure air from one of said first and second low pressure air components to carry out a pneumatic working step other than pre-expansion of said moldable object within the mold.

2. A procedure based on claim 1, characterized in that the low-pressure air supply is supplied with low pressure air from an auxiliary low-pressure air supply independent of compressed-air transferred from said moldable object.

3. A procedure based on claim 1, characterized in that low-pressure air is fed to the moldable object before the feeding in of high-pressure blow air, for the purpose of a pre-expansion.

4. A procedure based on claim 3, characterized in that after an execution of the transition phase, maintaining a pressure level within said container that corresponds to the pressure level within the low-pressure air supply.

5. A procedure based on claim 4, characterized in that the container is acted on with a pressure in the range of 25–40 bars by way of the high-pressure blow-air supply (16).

6. A procedure based on claim 5, characterized in that the container is acted on by the low-pressure air supply (15) with a pressure in the range of 10–25 bars.

7. A procedure based on claim 6, wherein said low-pressure air supply is used to operate pneumatic components, which execute positioning movements.

8. A procedure based on claim 1, characterized in that after an execution of the transition phase, maintaining a pressure level within said container that corresponds to the pressure level within the low-pressure air supply.

9. A procedure for molding a container from a thermoplastic material comprising:

subjecting a moldable object to a temperature treatment process;

feeding said moldable object to a blow station having a mold for contouring said container;

inserting said moldable object into said mold;

expanding said moldable object by the addition of high pressure blow air to form said container;

feeding said high pressure blow air from said container to a low pressure supply after said moldable object has been expanded, said low pressure supply having a lower pressure than said high pressure blow air;

monitoring the pressure in said low pressure air supply as said high pressure blow air is fed thereto to limit said pressure to a predetermined maximum;

venting said high pressure blow air remaining in said container to atmosphere after said transition phase; and using low pressure air from said low pressure air supply to operate pneumatic components which execute positioning movements.

* * * * *

UNITED STATES PATENT AND TRADEMARK OFFICE
CERTIFICATE OF CORRECTION

PATENT NO. :     5,648,026
DATED       :     July 15, 1997
INVENTOR(S) :    Ronald Weiss It is certified that error appears in the above-indentified patent and that said Letters Patent is hereby corrected as shown below:

On the Title Page, under "Date of Patent:",
"Jul. 15, 1997" should be --*Jul. 15, 1997--.

On the Title Page, after "[73] Assignee:", insert the following heading and information:

--[*] The term of this patent shall not extend beyond the expiration date of Pat. No. 5,585,066.--.

Signed and Sealed this

Twenty-fifth Day of November, 1997

Attest:

BRUCE LEHMAN

Attesting Officer

Commissioner of Patents and Trademarks